United States Patent [19]

Coquet et al.

[11] Patent Number: 5,385,262

[45] Date of Patent: Jan. 31, 1995

[54] VESSEL FOR STORING FLUID UNDER PRESSURE ABLE TO UNDERGO RUPTURE WITHOUT FRAGMENTATION

[75] Inventors: Pascal D. Coquet, Merignac; Pierre Schaeffner, Le Haillan, both of France

[73] Assignee: Societe Anonyme Dite Aerospatiale Societe Nationale Industrielle, Paris Cedex, France

[21] Appl. No.: 92,994

[22] Filed: Jul. 19, 1993

[30] Foreign Application Priority Data

Jul. 23, 1992 [FR] France .................. 92 09323

[51] Int. Cl.6 .............................................. B61D 8/08
[52] U.S. Cl. ..................................... 220/589; 220/588
[58] Field of Search ............... 220/589, 588, 586, 590, 220/591

[56] References Cited

U.S. PATENT DOCUMENTS

| | | | |
|---|---|---|---|
| 3,047,191 | 7/1962 | Young | 220/588 |
| 3,303,079 | 2/1967 | Carter | 220/590 |
| 3,486,655 | 12/1969 | Ragettli . | |
| 3,655,085 | 4/1972 | Aleck . | |
| 5,025,943 | 6/1991 | Forshan | 220/589 |

FOREIGN PATENT DOCUMENTS 0191655 8/1986 European Pat. Off. .
630861 12/1961 Italy ...................... 220/588

*Primary Examiner*—Joseph Man-Fu Moy
*Attorney, Agent, or Firm*—Sandler, Greenblum & Bernstein

[57] ABSTRACT

Vessel for storing a fluid under pressure, such as a gas storage vessel, of the type comprising an internal casing surrounded by an external hooping. The internal casing has symmetry about a longitudinal axis, a central pipe section and two extremity portions, and at least one of the extremity portions protruding outwardly. The hooping is of reinforcing fibers coated with a thermoplastic of thermosetting binder, and opposite the pipe section the hooping has at least one layer of fibers, known as longitudinal fibers, having a flat winding pattern and a winding angle as small as possible, so as to allow a boss, centered on the longitudinal axis of the protruded extremity, to be uncovered with fibers. Further, the hooping has at least one layer of fibers, known as circumferential fibers, having an almost 90° winding angle. Moreover, the pipe section further comprises at least one layer of fibers having a winding pattern that is either flat or helical with a winding angle ($\alpha_n$) of between the angle ($\alpha$) of the longitudinal fibers and 90°.

18 Claims, 1 Drawing Sheet

VESSEL FOR STORING FLUID UNDER PRESSURE ABLE TO UNDERGO RUPTURE WITHOUT FRAGMENTATION

BACKGROUND OF THE INVENTION

1. Field of the Invention

The present invention concerns vessels for storing fluid under pressure and more particularly, but not exclusively, vessels of the bottle type for storing gas, such as air, oxygen, nitrogen, carbon dioxide, used in various industrial areas.

More specifically, the invention further concerns bottles of the type comprising an internal casing with a form that is symmetric about a longitudinal axis and having a cylindrical portion or pipe section and two extremity portions, one extremity portion protruding outwardly, and further the internal casing is surrounded by a hooping of reinforcing fiber windings coated with a suitable binder.

2. Discussion of Background Information

When such vessels break, this generally occurs along the pipe section of the casing which opens suddenly. This occurs usually when the vessel contains a gas under high pressure. Such a rupture may cause the release of dangerous metal fragments which pose a threat to persons located nearby. Moreover, a recent official standard further imposes that this type of vessel is required to satisfy an under pressure rupture test. Moreover, the results of the test must produce a rupture without fragmentation of the internal casing of the vessel.

SUMMARY OF THE INVENTION

The aim of the present invention is to provide a vessel of the type meeting the requirements of this official standard.

To this effect, the invention concerns a vessel for storing fluid under pressure of the type comprising an internal casing with a form that is symmetric about a longitudinal axis and having one cylindrical central portion or pipe section and two extremity portions, where at least one of the extremity portions protrude outwardly. In addition, the internal casing is surrounded by a hooping of reinforcing fiber windings coated with a thermoplastic or thermosetting binder. The hooping opposite the pipe section is composed of at least one layer of fibers having a winding angle that is circumferential and known as circumferential fibers, and at least one layer of fiber wound in a planar manner known as longitudinal fibers. The winding angle of the longitudinal fibers is as small as possible so as to leave free, at the protruded extremity portion, an opening in the internal casing centered on the longitudinal axis. Moreover, the pipe section further comprises at least one layer of fibers having a winding pattern that is planar or helically and a winding angle of between that of the longitudinal fibers and 90°.

Vessels of this known type resist bursting mainly because of circumferential fibers. The longitudinal fibers, wound according to a flat or geodesic winding pattern are mainly intended to absorb the axial forces, because the longitudinal fibers exhibit a winding angle with respect to the longitudinal axis of the vessel which is too small to take up the circumferential rupture forces on bursting.

Whereas a vessel conforming to the present invention is able to satisfy the legal requirements concerning bursting without fragmentation of the internal casing due to the fact that the rupture forces are no longer exclusively borne by the circumferential layers. Instead, the rupture forces are partly taken up by the layer of fibers wound under an intermediate angle between 90° and that of the longitudinal fibers. These fibers take up and distribute the force initially absorbed by the circumferential layers when the vessel having a winding pattern that is flat or helical can be breaks.

Advantageously, the layer of fibers having a winding pattern that is flat or helical exhibits a winding angle equal to 90° less the winding angle of the longitudinal fibers. Moreover, several layers of fibers fiber windings having an intermediate angle starting with provided and can have different winding angles. For example, the winding angles can vary between the value of 90° and that of the longitudinal fibers. These layers of fibers actively participate in taking up the rupture forces by absorbing and distributing the force from the circumferential fibers, once as the circumferential fibers rupture, in turns according to the respective winding angle of the fiber windings.

Thus, instead of having a sudden bursting when the vessel breaks, there is a cascade rupture of the circumferential fibers and then of the fiber windings having an intermediate angle starting with those fibers with a winding angle closest to 90°. The result is a "soft" tearing of the vessel without rupture with fragmentation of the internal casing, and thus complying with the requirements to the official standards.

BRIEF DESCRIPTION OF THE DRAWINGS

Other characteristics and advantages shall appear more readily from a reading of a description of the preferred embodiment of a vessel according to the invention, this description being given solely by way of example and with reference to the accompanying drawings in which.

DETAILED DESCRIPTION OF THE PREFERRED EMBODIMENTS

Figure 1A:
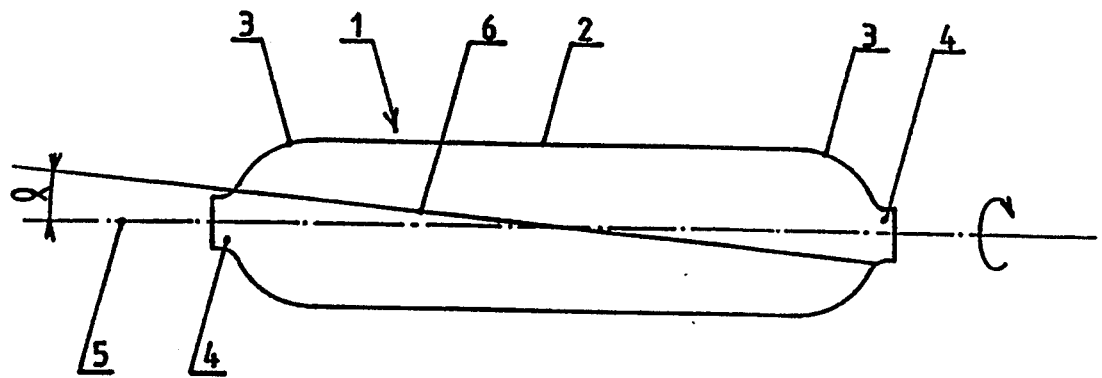
FIG. 1a and 1b are diagrams showing the flat and helical winding patterns respectively.
Figure 1B:
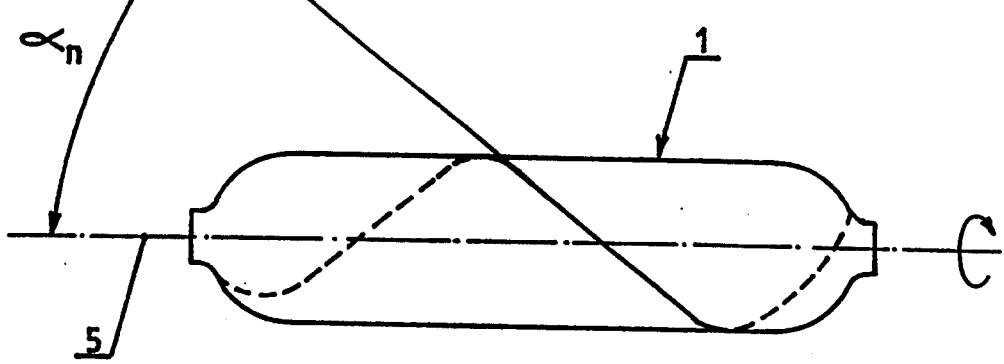

FIGS. 1a and 1b diagrammatically show at 1 a vessel formed of a cylindrical central body or pipe section 2 extended at its two extremities by an end piece 3 protruding outwardly and having a boss of revolution 4 coaxial with the axis 5 of the pipe section 2.

In FIG. 1a, a fiber symbolized at 6 is wound flat in that the bobbin unwinding the fiber 6 still moves within a given plane during winding of the vessel 1 which rotates around its axis 5.

The angle $\alpha$ the plane makes in which the bobbin moves by rotating around the vessel with respect to the axis 5 is known as the winding angle.

Having regard to the existence of bosses 4 at the extremities of the vessel and which must not be overlapped by fiber, the angle $\alpha$ shown on FIG. 1a corresponds to winding fibers flush with the bosses 4 and is the minimal winding angle.

For vessels of the type of those concerned by the present invention, there needs to exist, at least at one of the extremities, this type of boss 4 on which a connection end piece (not shown) is mounted for filling and emptying the vessel.

This minimal angle $\alpha$ depends on the morphology and dimensions of the vessels. For normal type vessels or bottles, this angle is about 20°.

Bottles of the type with an internal casing or a metallic liner covered with a hooping of reinforcing fiber windings coated with a suitable binder firstly, include layers of fibers placed according to the winding mode shown on FIG. 1a and known as longitudinal fibers and having a winding angle $\alpha$, for example of about 20°, and secondly layers of fibers wound circumferentially on the pipe section of the bottle may constitute a danger should accidental bursting occur. In fact, only the circumferential fibers of these vessels are able to resist the rupture forces on bursting, and the longitudinal fibers do not offer much resistance owing to the fact that the rupture stresses on bursting are mainly exerted on the pipe section and generate circumferential traction forces which the longitudinal fibers are unable to take up owing to their winding angle.

As a result, a sudden rupture of the circumferential fibers when their limit of resistance is reached is likely to result in fragmentation of the metallic internal casing and projection of splinters.

In accordance with the invention, with a conventional covering of the internal casing or liner, especially a metallic liner, with the aid firstly of fibers wound circumferentially around the pipe section and secondly fibers wound longitudinally, this covering is to be replaced by another covering including, not merely the fibers wound circumferentially and longitudinally, but also fibers wound according to one or several intermediate angles between the winding angle of the circumferential fibers and the winding angle of the longitudinal fibers.

Figure 2:
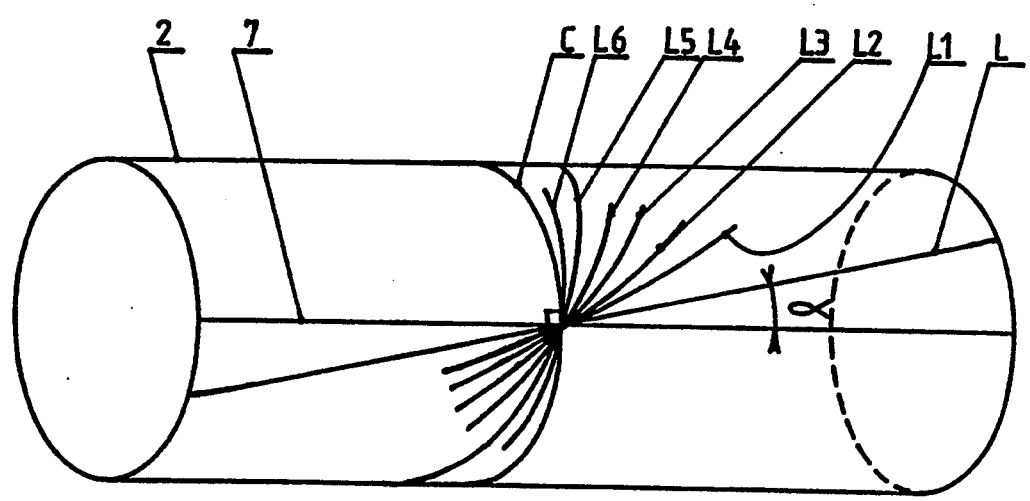
FIG. 2 is a view showing the winding method of the fibers in accordance with the invention on a cylinder, such as a vessel pipe section.

FIG. 2 diagrammatically shows the pipe section of a vessel with an internal casing, and shows various layers of fibers wound on this pipe section 2.

A fiber is placed circumferentially at C and, along with a generating line 7 of the pipe section 2, forms an angle almost equal to 90°. A longitudinal fiber is shown at L and placed at a minimum angle $\alpha$ with respect to the generating line.

In accordance with the invention, fibers are wound along intermediate angles of between 90° and $\alpha$, the fibers also being designated as longitudinal fibers and allocated with a different index according to their angle of winding.

FIG. 2 shows six fibers, respectively $L_1$ to $L_6$, having winding angles $\alpha_1$ to $\alpha_6$ respectively of increasing values stepped between $\alpha$ and 90°.

Thus, the layers of longitudinal fibers L to $L_6$ exhibit between them a stress gradient or resistance to progressive bursting gradient. In this regard, the maximum stress allowed by the fibers wound along the angle $\alpha_6$ (the closest to 90°) is slightly smaller than that of the circumferential fibers C, but significantly larger than that of the fibers wound under the angle $\alpha_5$, and much greater than that of the fibers wound along the angle $\alpha_4$, and so on.

The result is that should the circumferential fibers C break, it is the fibers $L_6$ which first of all sustain the shock and then, the latter releasing, the fibers $L_5$. The result of this structure is a chain rupture of all the longitudinal fibers and in turn a rupture of the pipe section of the flying type, that is a "soft" tearing without fragmenting the internal casing.

A single winding angle may be provided between the values of 90° and $\alpha$, in which case it is preferable that this angle has a value approximately equal to $90° - \alpha$.

Several angles are preferably provided whose values are stepped, possibly regularly, for example between the value $\alpha$ and the value of $90° - \alpha$.

Nevertheless, it is possible to wind longitudinal fibers with an intermediate winding angle of between 90° and $90° - \alpha$.

According to one embodiment intended to approximately divide into two equal shares the circumferential rupture forces between firstly the circumferential fibers C and secondly all the longitudinal fibers (L, $L_1$, $L_2$, $L_3$ . . . ), it is possible to provide in addition to the minimal winding angles nine winding angles $\alpha_1$ to $\alpha_9$ for nine layers of fibers $L_1$ to $L_9$.

The winding angle $\alpha_8$ of the layer $L_8$ may be equal to $90° - \alpha$ and the winding angle $\alpha_9$ is between 90° and $90° - \alpha$.

In the case of a vessel with hemispherical extremities, it is possible to envisage having a fanshaped distribution of fibers $L_n$ with graduated winding angles of between 90° and $\alpha$ whilst allowing for a winding of fibers geodesically on the extremities.

The number of winding angles of the longitudinal fibers $L_n$ may vary significantly in the same way as the number of fibers wound under the same angle, as well as the number and stepping of the layers of fibers wound along the various possible angles (L,$L_n$,C) according to the morphology, dimensions and nature of the vessel, the nature of the material constituting the casing (metal or thermoplastic material or elastomer, for example), the nature of the fibers (glass, carbon, Kevlar, for example) and the binder of the matrix (thermoplastic or thermosetting material).

According to the winding angle ($\alpha_n$), the longitudinal fibers ($L_n$) of the invention are wound either via a flat winding (FIG. 1a) or via a helical winding (FIG. 1b).

It is to be noted that the implementation of the invention does not necessarily imply an excess dimensioning of the wall of the vessel, that is the adding of additional layers of longitudinal fibers. In fact, it is preferable to implement the same number of layers of longitudinal fibers for a given type of bottle as in the conventional production mode, but this number of layers shall be distributed on the various layers placed with the various angles in question ($\alpha$, $\alpha_1$, $\alpha_2$, $\alpha_3$, etc.).

Thus, the overall weight and thickness of the wall of this type of bottle of the invention shall be indentical to those of a given bottle embodied according to the prior art.

The invention is applicable to any vessel, especially any bottle type vessel, with a bottom or extremities protruding outwardly, irrespective of the shape of the protrusion, that is hemispherical, semi-elliptic, oval of Cassini.

On these protruded extremities, the fiber windings shall be made goedesically as far as possible by any method.

The shape of these extremities could of course be optimized according to the number and placing angles of the various longitudinal fibers.

We claim:

1. A vessel for storing fluid under pressure, comprising:

an internal casing comprising a central cylindrical portion, a first extremity portion, and a second extremity portion, one of said first extremity portion and said second extremity portion protruding to a terminal boss, and said terminal boss is centered with respect to a longitudinal axis of said internal casing;

an outer hooping of reinforcing fibers coated with a thermoplastic or thermosetting binder surrounding said internal casing comprising:

at least one layer of circumferential fibers placed circumferentially about said internal casing to have a winding angle of substantially 90° with respect to said longitudinal axis of said internal casing;

at least one layer of longitudinal fibers placed in a planar manner with a winding angle $\alpha$ as close as possible to being substantially parallel to said longitudinal axis of said internal casing without overlapping said terminal boss; and at least one layer of fibers placed with a winding angle $\alpha_n$, with respect to said longitudinal axis of said internal casing, between said winding angle $\alpha$ of said at least one layer of longitudinal fibers and 90°.

2. The vessel as described in claim 1, wherein the winding angle $\alpha_n$ is 90° minus said winding angle $\alpha$.

3. The vessel as described in claim 1, comprising a plurality of layers placed with a winding angle $\alpha_n$, said plurality of layers comprising different winding angles $\alpha_n$.

4. The vessel as described in claim 3, wherein said different winding angles $\alpha_n$ are staggered between 90° and said winding angle $\alpha$ of said at least one longitudinal layer.

5. The vessel as described in claim 3, wherein one of said different winding angles $\alpha_n$ has a value equal to 90° minus the winding angle $\alpha$ of said at least one layer of longitudinal fibers, and other of said different winding angles $\alpha_n$ being distributed on both sides of the one different winding angle $\alpha_n$.

6. The vessel as described in claim 5, comprising a plurality of layers of circumferential layers, a plurality of layers of longitudinal fibers with a winding angle $\alpha$, and a plurality of layers of fibers placed with a winding angle $\alpha_n$.

7. The vessel as described in claim 1, wherein said fibers placed with a winding angle $\alpha_n$ are planarly positioned.

8. The vessel as described in claim 1, wherein said fibers placed with a winding angle $\alpha_n$ are helically positioned.

9. The vessel as described in claim 2, wherein said fibers placed with a winding angle $\alpha_n$ are planarly positioned.

10. The vessel as described in claim 2, wherein said fibers placed with a winding angle $\alpha_n$ are helically positioned.

11. The vessel as described in claim 3, wherein said fibers placed with a winding angle $\alpha_n$ are planarly positioned.

12. The vessel as described in claim 3, wherein said fibers placed with a winding angle $\alpha_n$ are helically positioned.

13. The vessel as described in claim 4, wherein said fibers placed with a winding angle $\alpha_n$ are planarly positioned.

14. The vessel as described in claim 4, wherein said fibers placed with a winding angle $\alpha_n$ are helically positioned.

15. The vessel as described in claim 5, wherein said fibers placed with a winding angle $\alpha_n$ are planarly positioned.

16. The vessel as described in claim 5, wherein said fibers placed with a winding angle $\alpha_n$ are helically positioned.

17. The vessel as described in claim 6, wherein said fibers placed with a winding angle $\alpha_n$ are planarly positioned.

18. The vessel as described in claim 6, wherein said fibers placed with a winding angle $\alpha_n$ are helically positioned.

* * * * *

UNITED STATES PATENT AND TRADEMARK OFFICE
CERTIFICATE OF CORRECTION

PATENT NO. : 5,385,262

DATED : January 31, 1995

INVENTOR(S) : Pascal D. COQUET et al.

It is certified that error appears in the above-indentified patent and that said Letters Patent is hereby corrected as shown below:

At the cover sheet, section [56], line 5 under U.S. Patent Documents, change "Forshan" to ---Forsman---.

At column 2, lines 8 and 9, delete "having a winding pattern that is flat or helical can be".

At column 2, lines 13 and 14, change "fiber windings having an intermediate angle starting with provided and" to --- having a winding pattern that is flat or helical can be provided and---.

At column 4, line 15, change "angles" to ---angle $\alpha$---.

Signed and Sealed this

Third Day of October, 1995

BRUCE LEHMAN

Attest:

*Attesting Officer*   *Commissioner of Patents and Trademarks*